United States Patent [19]

Iwase et al.

[11] Patent Number: 5,150,344
[45] Date of Patent: Sep. 22, 1992

[54] TRACKING SERVO SYSTEM

[75] Inventors: Munehiko Iwase; Hidehiro Ishii; Noriyoshi Takeya; Tatsuya Fukuda, all of Saitama, Japan

[73] Assignee: Pioneer Electronic Corporation, Tokyo, Japan

[21] Appl. No.: 483,705

[22] Filed: Feb. 23, 1990

[30] Foreign Application Priority Data

Sep. 28, 1989 [JP] Japan .................................. 1-255003

[51] Int. Cl.⁵ .............................................. G11B 7/00
[52] U.S. Cl. .............................. 369/44.28; 369/44.29
[58] Field of Search ................... 360/77.02, 78.04; 369/32, 43, 44.28, 44.29, 44.31, 44.32, 44.33, 44.35

[56] References Cited

U.S. PATENT DOCUMENTS

| 4,651,314 | 3/1987 | Yoshikawa et al. | 369/44.28 |
| 4,754,129 | 6/1988 | Koh | 369/44.37 |
| 4,837,637 | 6/1989 | Akiyama et al. | 369/32 |
| 4,866,688 | 9/1989 | Ohtake et al. | 369/44.28 |

FOREIGN PATENT DOCUMENTS

| 0305191 | 3/1989 | European Pat. Off. |
| 0322841 | 7/1989 | European Pat. Off. |
| 3604604 | 9/1986 | Fed. Rep. of Germany |

Primary Examiner—Donald McElheny, Jr.
Attorney, Agent, or Firm—Sughrue, Mion, Zinn, Macpeak & Seas

[57] ABSTRACT

In the tracking servo system according to the present invention, the noise removal means for removing a high-frequency noise component contained in the tracking error signal is in an operative state in normal playing operation, while the noise removal means is made to be in an inoperative state at least in an opened state of the servo loop.

5 Claims, 2 Drawing Sheets ously and a focus control circuit 9 and a tracking control circuit 10 corresponding to the detected scar position from the drawings, FIGS. 1 and 2, the operation will now be described.

TRACKING SERVO SYSTEM

BACKGROUND OF THE INVENTION

The present invention relates to a tracking servo system in a disk player.

In a tracking servo system, if an information recording disk (hereinafter, simply referred to as a "disk") to be played has, for example, a scar or scratch on its recording surface, there is a possibility that a noise due to the scar will be superimposed as a high-frequency noise component on a tracking error signal when an information reading point of a pickup follows a recording track at the scar portion so that a misoperation such as a so-called track jump or the like is caused by the high-frequency noise component.

In the case where the tracking servo system has a digital servo circuit configuration, when an error signal is applied to an A/D converter, a return noise is generated in the A/D converter because of the high-frequency noise component added by the scar which cannot be removed by a low-pass filter so that a misoperation is caused in the A/D converter to thereby cause a track jump.

As a measure against such noise, conventionally, for example, as shown in FIG. 3, in a tracking servo system having a digital servo circuit configuration, a transistor $Q_0$ is connected between a signal line L for a tracking error signal and a reference electric potential point (for example, a ground level) and a scar on a disk is detected during play of the disk by a scar detection circuit 30 having a configuration as disclosed in Japanese Patent Unexamined Publication No. Sho. 59-94248 or the like so that the transistor $Q_0$ is turned on in response to a detection output of the scar detection circuit 30 to thereby reduce the level of the tracking error signal to a reference one.

In the conventional apparatus having such a configuration, however, there has been a disadvantage in that it is necessary to especially provide the circuit 30 for exclusive use for scar detection, and that since various kinds of scars may exist on a disk, the circuit configuration becomes a factor of increase of the cost because the circuit must detect all of such various scars. Further, there has been a disadvantage in that a predetermined processing time is taken for detecting a scar so that processing cannot be performed in real time, and therefore a track jump has been caused by the influence of the delay time.

SUMMARY OF THE INVENTION

It is therefore an object of the present invention to provide a tracking servo system in a disk player in which a high- frequency noise component due to a defect such as a scar or the like can be removed without using any scar detection circuit for exclusive use.

According to the present invention, the tracking servo system provided with a tracking error signal generation means for generating a tracking error signal corresponding to the direction and quantity of deviation, from a reference position, of a relative position between a recording track of an information recording disk and an information reading point in a radial direction of the information recording disk, a servo loop for controlling the relative position in accordance with the polarity and level of the tracking error signal, and a control means for controlling opening/closing of the servo loop, further comprises a noise removal means for removing a high-frequency noise component contained in the tracking error signal, the noise removal means being controlled by the control means so as to be in an inoperative state at least when the servo loop is in an opened state.

In the tracking servo system according to the present invention, the noise removal means for removing a high-frequency noise component contained in the tracking error signal is in an operative state in normal playing operation, while the noise removal means is made to be in an inoperative state at least in an opened state of the servo loop.

DETAILED DESCRIPTION OF THE PREFERRED EMBODIMENT

Referring to the accompanying drawings, an embodiment of the present invention will be described in detail hereunder.

Figure 1:
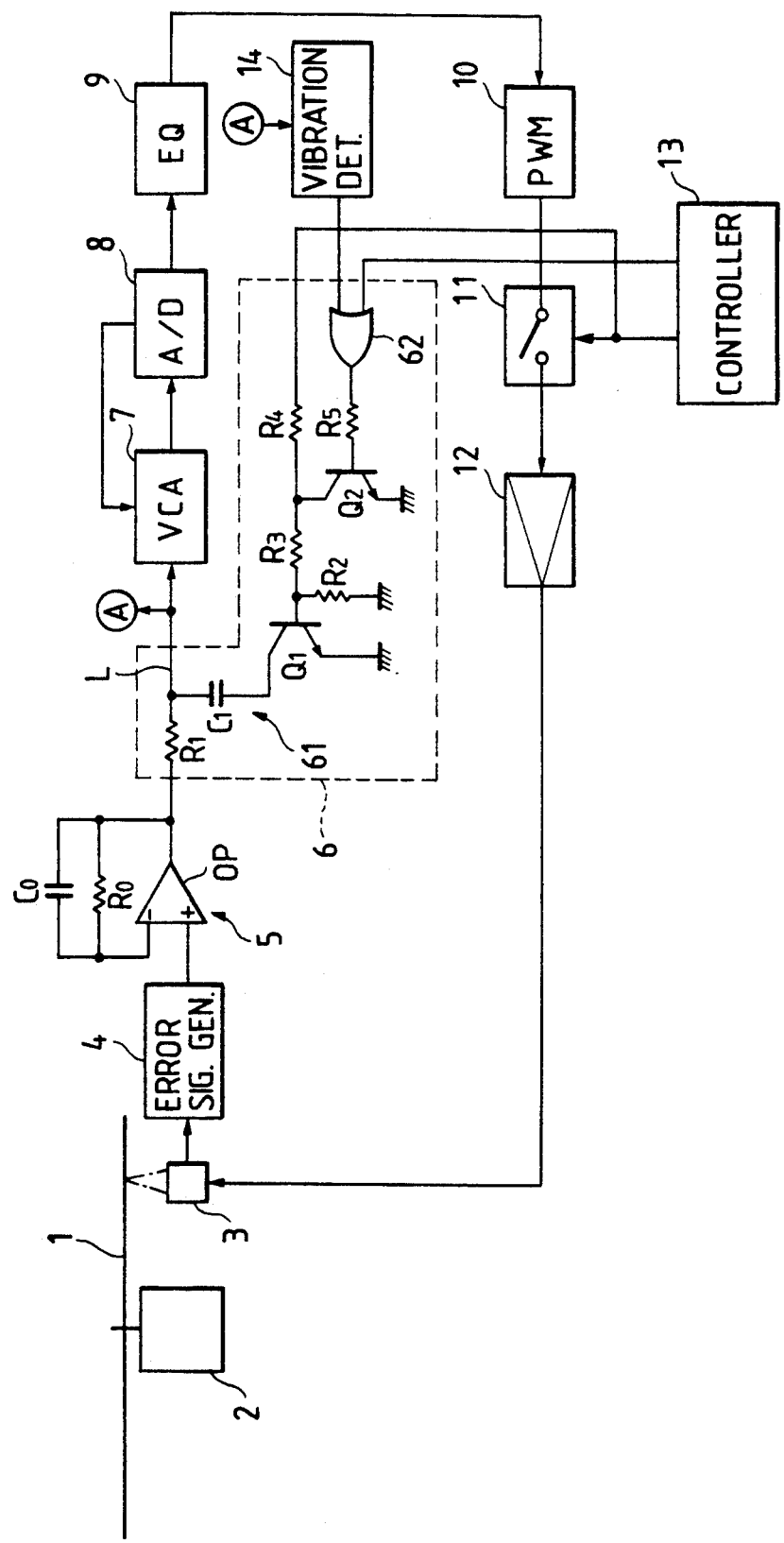
FIG. 1 is a block diagram showing an embodiment of the present invention.

FIG. 1 is a block diagram showing an embodiment of the tracking servo system having, for example, a digital servo circuit configuration according to the present invention. In the drawing, a disk 1 is driven to rotate by a spindle motor 2, and information recorded on the disk 1 is read by an optical pickup 3. The pickup 3 is provided with an optical system including a laser light source and an objective lens, a focus actuator, a tracking actuator, a photodetector, and the like, and the pickup 3 is mounted on a carriage (not shown) provided so as to be movable in the radial direction of the disk.

The output of the photodetector built in the pickup 3 is supplied to a tracking error signal generation circuit 4. The tracking error signal generation circuit 4 is configured so as to generate a tracking error signal having a polarity and a level corresponding to the direction and quantity of deviation, from a reference position, of the relative position between a recording track of the disk and a laser light spot (an information reading point) in the radial direction of the disk, by use of, for example, a well-known three-beam method, The tracking error signal generated by the tracking error signal generation circuit 4 is supplied to a low-pass filter 5 constituted by an operational amplifier OP, a capacitor $C_0$, and a resistor $R_0$. The low-pass filter 5 is provided for limiting the frequency of the tracking error signal to a value, for example, 15 KHz, which is not higher than a half of a sampling frequency, for example, 33 KHz, so that no return noise is generated in A/D conversion when the tracking error signal is sampled with the above sampling frequency so as to be converted into a digital signal in an A/D converter 8 which will be described later.

The tracking error signal having a frequency which has been limited by the low-pass filter 5 is supplied to the A/D converter 8 through a noise removal circuit 6 and a VCA (voltage controlled amplifiers) 7. The specific configuration and the operation of the noise removal circuit 6 will be described later. The gain of the VCA 7 is controlled in accordance with the level of the tracking error signal to be applied to the A/D converter 8. In the A/D converter 8, the tracking error signal is sampled on the basis of a sampling pulse having a sampling frequency of, for example, 33 KHz as described above so that digital data corresponding to the thus obtained sample value are generated. The digitized tracking error signal, which is the output of the A/D converter 8, is subjected to phase compensation and gain compensation in a digital equalizer 9.

The digitized tracking error signal which has been subjected to phase compensation by means of the digital equalizer 9 is supplied to a PWM (pulse width modulation) circuit 10. The PWM circuit 10 is configured so as to generate a pulse signal having a pulse width corresponding to the polarity and level of the tracking error signal on the basis of a timing pulse synchronized with the sampling pulse of the A/D converter 8. The output pulse of the PWM circuit 10 is supplied as a drive signal to the tracking actuator built in the pickup 3 through a loop switch 11 and a drive amplifier 12.

Thus, a tracking servo loop is formed. When the loop switch 11 is in an ON (closed) state, the tracking servo loop is in a loop closed state. In the loop closed state, the tracking actuator is driven on the basis of the pulse signal having a pulse width corresponding to the polarity and level of the tracking error signal so that the laser light spot of the pickup 3 can be made to accurately follow a recording track of the disk 1. Opening/closing of the loop switch 11 is controlled by a controller 13 constituted, for example, by a microcomputer so that the loop switch 11 is closed (turned on) in response to a high-level of a loop closing signal generated from the controller 13.

Next, description will be made as to the specific configuration and operation of the foregoing noise removal circuit 6.

First, the specific configuration of the noise removal circuit 6 will be described. The noise removal circuit 6 includes: a low-pass filter 61 which is constituted by a resistor $R_1$ inserted in a signal line L for the tracking error signal and a capacitor $C_1$ connected at its one end to the output terminal of the resistor $R_1$; a transistor $Q_1$ is connected between the other end of the capacitor $C_1$ and ground so as to selectively activate the low-pass filter 61; and a transistor $Q_2$ for forceably turning-off the transistor $Q_1$; in which a loop closing signal is supplied to the base of the transistor $Q_1$, which is connected to ground through the resistor $R_2$, and through resistors $R_3$ and $R_4$ to the controller 13; a detection pulse from a vibration detection circuit 14 or a control pulse generated from the controller 13 in a predetermined period is supplied to the base of the transistor $Q_2$ through an OR gate 62 and a resistor $R_5$. If a disturbance such as a vibration or the like is exerted to the player body in the operation of playing a disk, a change occurs in the level of the tracking error signal. The vibration detection circuit 14 is configured so as to always monitor the change of the level of the tracking error signal in the operation of playing a disk so that when the circuit 14 detects the fact that the signal level becomes a predetermined value or more, the circuit produces a detection pulse for a predetermined period of time from the detection point of time.

Figure 2:
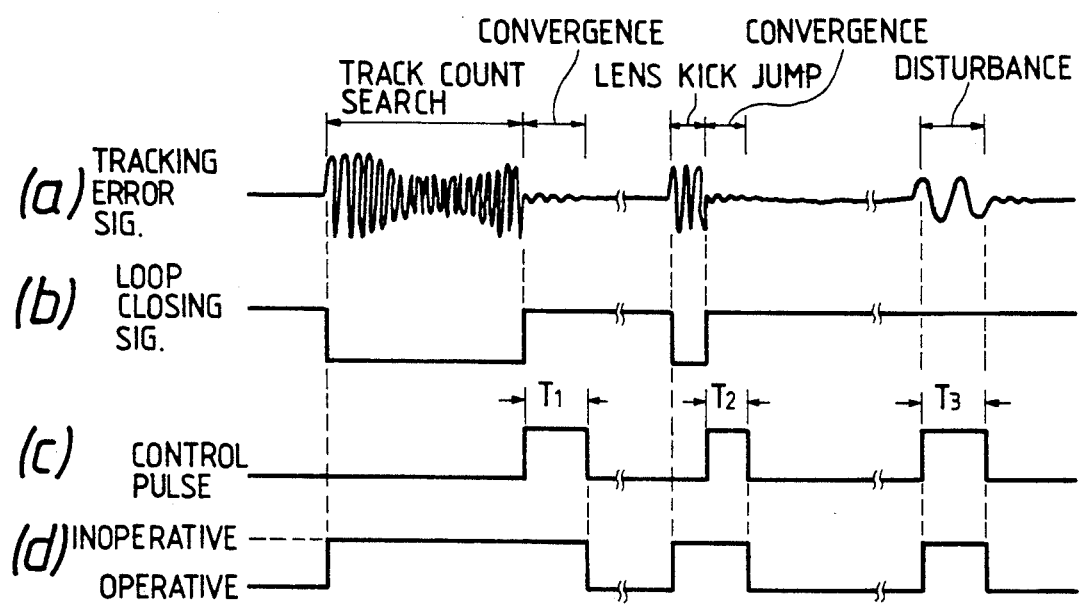
FIG. 2 is a diagram showing waveforms at various portions for explaining the noise removal operation.
Figure 3:
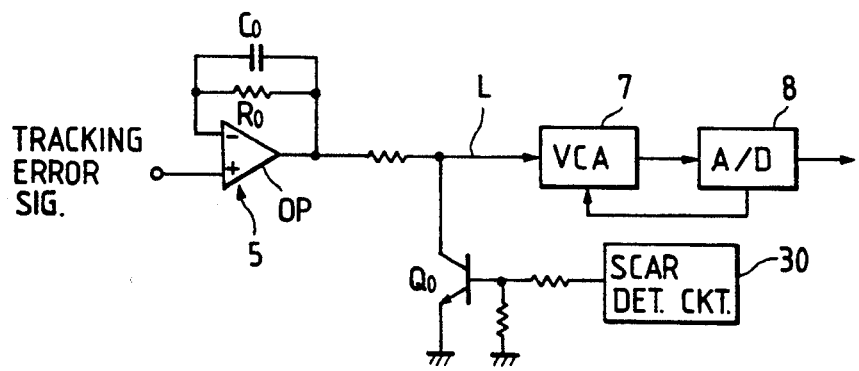
FIG. 3 is a block diagram showing a conventional tracking servo system.

Next, referring to the waveform diagram of FIG. 2, description will be made as to the operation of the noise removal circuit 6 having such a configuration. In operation, three states are considered as shown in FIG. 2(a), one being a state of a so-called track count search in which the number of tracks crossed by the laser light spot is counted while moving the pickup 3 to thereby search a desired track, another one being a state of a so-called lens kick jump in which the objective lens built in the pickup 3 is kicked to thereby make the laser light spot jump tracks by a predetermined number, the remaining one being a state in which a disturbance such as an vibration or the like is exerted.

First, description will be made as to the case of the track count search. In normal playing operation, the loop switch 11 is closed (turned on) in response to, for example, a high-level of a loop closing signal (b) generated from the controller 13 so that the tracking servo loop is made to be in the closed state. At this time, the high-level loop closing signal(b) is applied also to the base of the transistor $Q_1$ constituting the noise removal circuit 6 so that the transistor $Q_1$ is turned on as shown in FIG. 2(d). As a result, the low-pass filter 61 is made operative so as to remove the high-frequency noise component contained in the tracking error signal. If the track count search is started, the loop closing signal (b) disappears (to be low in level) so that the loop switch 11 is opened (turned off) to make the tracking servo loop be in the opened state, and at the same time, the transistor $Q_1$ is turned off to thereby make the low-pass filter 61 inoperative. Thus, the track count search is executed without reducing the gain of the high-frequency tracking error signal (a).

Upon completion of the track count search, the loop closing signal (b) is generated from the controller 13 again and the tracking servo loop is made to be in the closed state in response to the loop closing signal (b). At this time, although the loop closing signal (b) is applied also to the base of the transistor $Q_1$, a control pulse (c) having a pulse width of a predetermined period of time $T_1$ necessary for convergence of the tracking error signal (a) is generated from the controller 13 and applied to the base of the transistor $Q_2$ so that the transistor $Q_1$ is made to be in the OFF state and the inoperative state of the low-pass filter 61 is further maintained for the predetermined period of time $T_1$ (d) even after the completion of the track count search.

The same operation as that in the track count search is performed also in the case of the lens kick jump, and the inoperative state of the low-pass filter 61 is further maintained for a predetermined period of time $T_2$ (d) even after completion of the lens kick jump.

Next, description will be made as to the operation in the case of exertion of a disturbance such as an oscillation or the like. If a disturbance is exerted to the player body in normal playing operation, the detection pulse (c) is generated from the vibration detection circuit 14 for a predetermined period of time $T_3$ after a point of time upon detection of the fact that the level of the tracking error signal (a) becomes a predetermined value or more. The transistor $Q_2$ is turned on in response to the detection pulse (c) to turn-off the transistor $Q_1$ so that the low-pass filter 61 is made to be in the inoperative state (d). Thus, the high-frequency gain for the tracking error signal (a) can be made higher than that in the case of normal reproducing operation to thereby make the tracking error signal insensitive against the vibration.

As described above, the low-pass filter 61 of the noise removal circuit 6 is made to be in the operative state in normal playing operation so as to remove the high-frequency noise component contained in the tracking error signal (a) due to a scar or the like to thereby prevent the high-frequency noise component from being applied to the A/D converter 8, while the low-pass filter 61 is made to be in the inoperative state for the period from a point of time of track count search start to a point of time when the predetermined time $T_1$ has elapsed after termination of the track count search, for the period from a point of time of lens kick jump start to a point of time when the predetermined time $T_2$ has elapsed after termination of the lens kick jump, or for the predetermined period $T_3$ upon exertion of a disturbance such as a vibration or the like, to thereby increase the high-frequency gain for the the tracking error signal (a), so that a high-frequency noise component due to a defect such as a scar or the like can be removed with no obstacle to the track count search operation, the lens kick jump operation, the convergence of those operations, and the vibration detection, without using such a conventional circuit for exclusive use for scar detection.

Although the tracking servo system of the digital servo circuit configuration has been described by way of example in the foregoing embodiment, the present invention is not particularly limited to such a tracking servo system of the digital servo circuit configuration, but can be applied also to a tracking servo system of an analog servo circuit configuration.

As described above, the tracking servo system in a disk player according to the present invention is configured such that the noise removal means for removing a high-frequency noise component contained in a tracking error signal is in a operative state in normal playing operation, while the noise removal means is made to be in an inoperative state at least in the opened state of the servo loop. Therefore, it is possible to remove a high-frequency noise component due to a defect such as a scar or the like without using any scar detection circuit for exclusive use.

What is claimed is:

1. A tracking servo system for use in a recording/reproducing apparatus, said recording/reproducing apparatus recording to and reproducing from a recording medium having a plurality of recording tracks, said tracking servo system comprising:
    tracking error signal generation means for generating a tracking error signal corresponding to a direction and a quantity of deviation of a relative position between a recording track of an information recording disk and an information reading point in a radial direction of said information recording disk;
    a servo loop for controlling said relative position in accordance with a polarity and level of said tracking error signal;
    control means for controlling opening/closing of said servo loop; and
    noise removal means for removing a high-frequency noise component contained in said tracking error signal, said noise removal means being controlled by said control means so as to be in an inoperative state at least when said servo loop is in an opened state, wherein said noise removal means has an inoperative state also during a predetermined period immediately after said servo loop shifts from said opened state to a closed state.

2. A tracking servo system according to claim 1 further comprising:
    vibration detection means for monitoring change of the level of said tracking error signal, when said change of tracking signal becomes a predetermined level said variation detection means produces a pulse having a predetermined period of time from said detection point of time; and
    logical means for generating a logical sum of said pulse produced by said vibration detection means and an output of said control means for controlling opening/closing of said servo loop;
    wherein said noise removal means being controlled in accordance with said logical sum.

3. A tracking serve system according to claim 1 wherein said noise removal means comprises:
    a low-pass filter including resistor means inserted in a signal line for said tracking error signal and capacitor means connected at its one end to the output terminal of said resistor; and
    a switching means connected between the other end of said capacitor means and ground level for selectively activating said low-pass filter in accordance with an output of said control means.

4. A tracking servo system for use in a recording/reproducing apparatus, said recording/reproducing apparatus recording to and reproducing from a recording medium having a plurality of recording tracks and a pick-up device for recording on and reproducing from said recording tracks, said pick-up device performing at least a track search and a kick jump to move to a desired one of said plurality of recording tracks, said tracking servo system comprising:
    a tracking error signal generator generating an output tracking error signal in proportion to a deviation of the pick-up device from a track on a recording medium;
    a selective low-pass filter selectively coupled to the output of said tracking error signal generator;
    a vibration detector disturbance of the tracking error signal, and generating an output signal when the level of the tracking error signal becomes greater than a predetermined level; and
    a controller unit for generating a control pulse signal in response to the termination of one of a track search and a kick jump of the pick-up device, wherein said selective low-pass filter is coupled to the output of said tracking error signal generator in response to one of the output from the vibration detector and the control pulse signal from the controller so that any high frequency signals contained in the tracking error signal due to a distortion of the recording medium would be eliminated, thereby increasing the accuracy of the tracking error signal.

5. The tracking servo system of claim 4, wherein the recording medium is a compact disk.

* * * * *